UNITED STATES PATENT OFFICE.

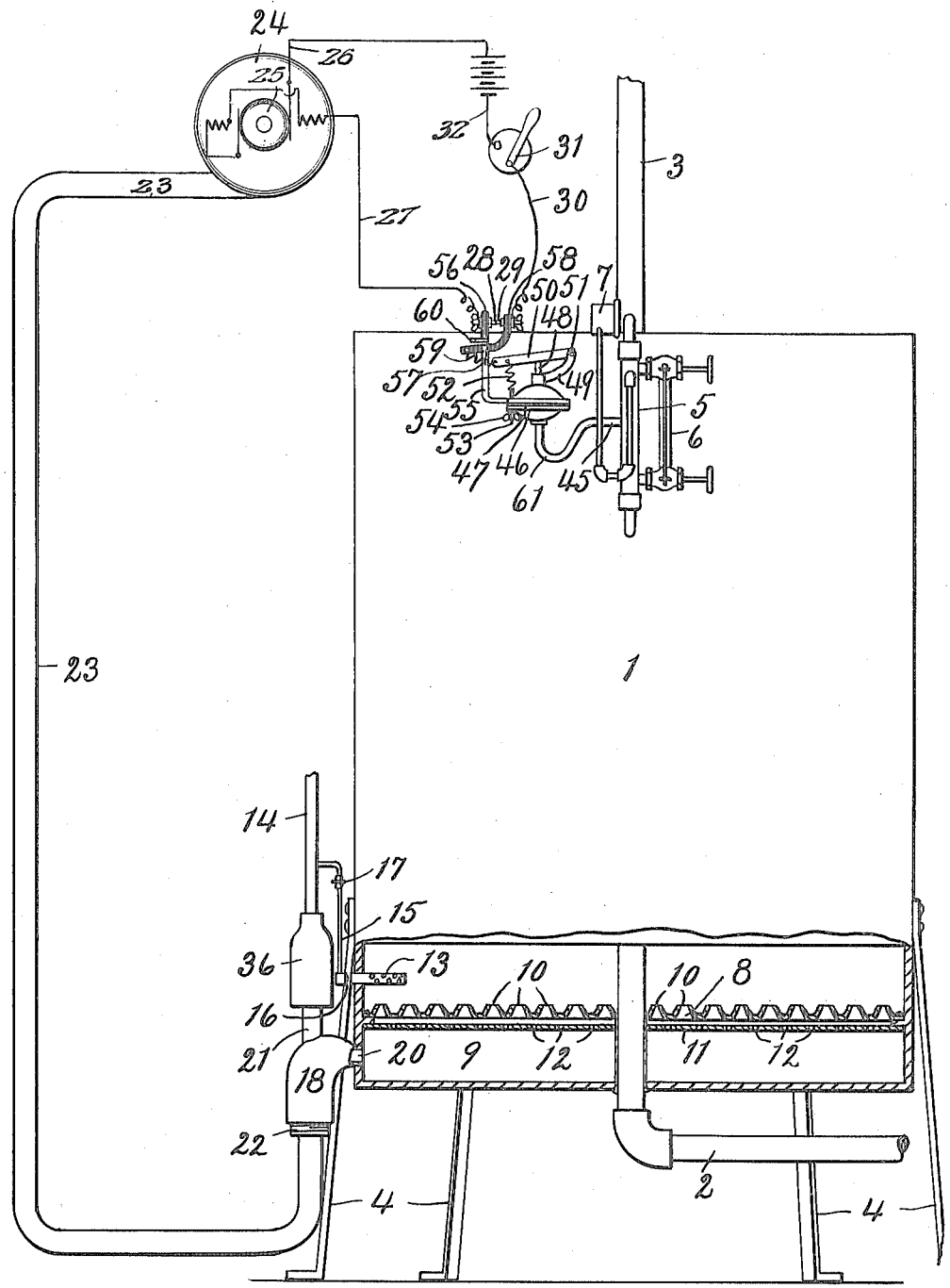

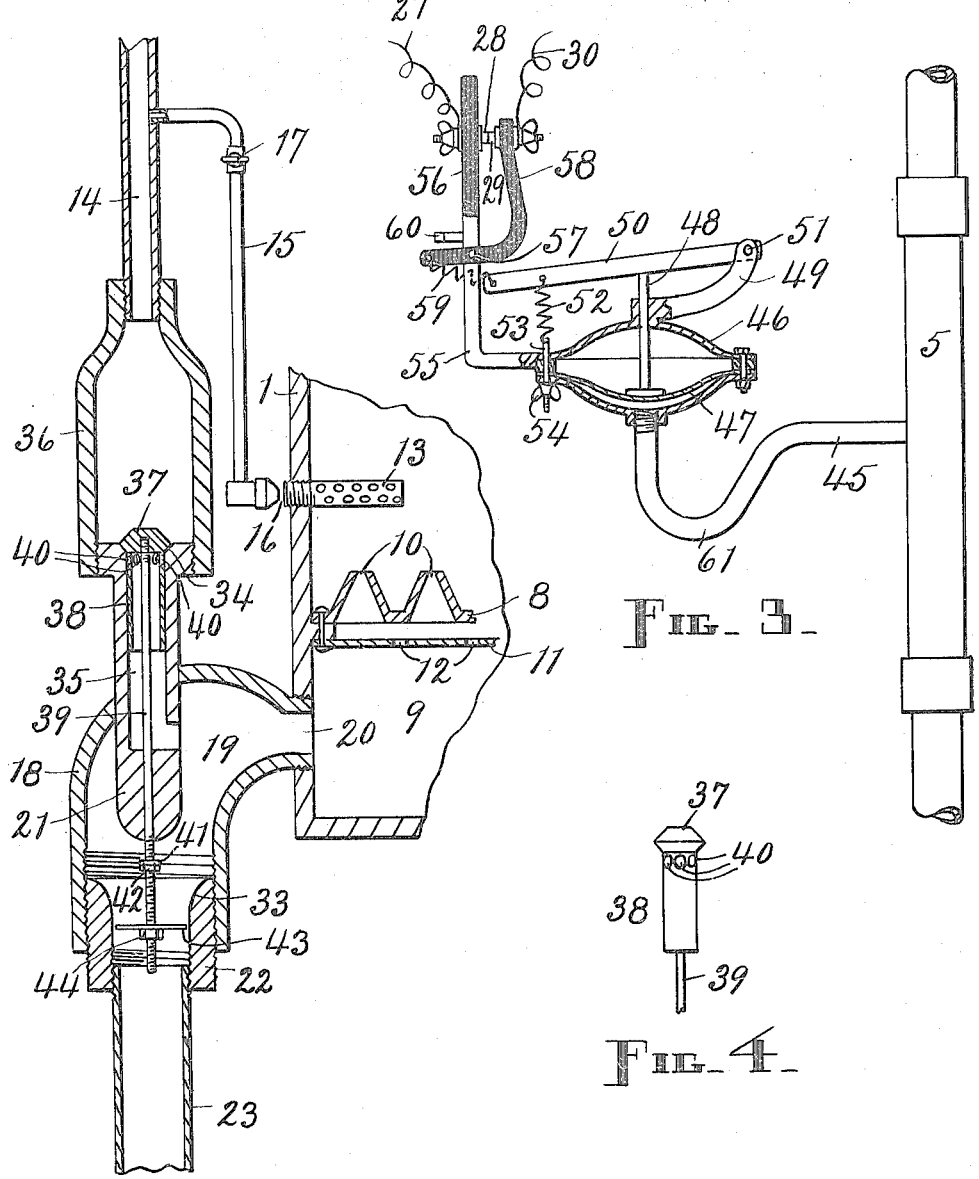

ELMER F. FISHER, OF SPRINGFIELD, MASSACHUSETTS.

HEATING APPLIANCE.

1,185,081. Specification of Letters Patent. Patented May 30, 1916.

Application filed March 16, 1915. Serial No. 14,838.

*To all whom it may concern:*

Be it known that I, ELMER F. FISHER, a citizen of the United States of America, residing at Springfield, in the county of Hampden and State of Massachusetts, have invented a new and useful Heating Appliance, of which the following is a specification.

My invention relates to improvements in appliances for generating heat, more especially by means of gas, in boilers of various types and other heaters, and consists of certain peculiar automatically-controlled valve mechanism for admitting a supply of gas and air to the burner and shutting off such supply, including an air-operated gas valve, together with such auxiliary and subsidiary parts and members as may be required or desired in order to render the appliance complete and serviceable, all as hereinafter set forth.

The objects of my invention are, first, to produce a comparatively simple and inexpensive, yet practical and efficient, appliance for supplying gas and air in the proper quantities and proportions to the burner of a heater, whereby the required amount of heat is economically generated in such heater, or in other words, the maximum amount or the necessary amount of heat is generated from the minimum amount of gas; second, to provide such an appliance which is automatic in operation, being controlled or governed by the rising and falling temperature of the heater, it being this feature, in connection with my valve structure, that is responsible for the great saving in gas that is effected through the use of said appliance; third, to utilize in said appliance the air supply with which to open the gas valve, or with which directly to control said valve, and, fourth, to provide an appliance of this kind that is safe, easily taken care of, not liable to get out of order, and can be installed in or in connection with old as well as new heaters of various types.

Other objects and advantages will appear in the course of the following description.

I attain the objects and secure the advantages of my invention by the means illustrated in the accompanying drawings, in which—

Figure 1 is a side elevation and partial section of a practical form of the appliance, showing the same applied to a steam boiler; Fig. 2, an enlarged vertical section through the valve and valve mechanism and connected parts and members; Fig. 3, an enlarged side elevation and partial section of the automatic circuit opening and closing device, and Fig. 4, an enlarged side elevation of the valve.

Similar numerals designate similar parts throughout the several views.

Although I have illustrated my invention in connection with a tubular steam boiler for house-heating purposes, it is to be understood, as I have hereinbefore intimated, that said invention is applicable to hot-water heaters, and to other kinds of heaters, even stoves and hot-air furnaces being included. It is to be understood, furthermore, that any suitable controller for the electric circuit, in which the motor for the blower is located, may be used, the one herein shown being suitable for a heater which is provided with a water-column.

In addition to the above-noted changes that are permissible, various changes or modifications in the shape, size, arrangement, and construction of some or all of the parts of the appliance may be made, and all without departing from the spirit of my invention.

It should be stated, before proceeding further, that the air supplied by this appliance to mix with the gas, and which also is utilized for opening the gas valve, holding said valve open, and permitting the same to close, is introduced under forced draft, any suitable power-driven fan, pump, or suction device being employed to introduce such air under pressure.

In the first view a tubular steam boiler is represented at 1, such boiler being broken away at the bottom to show the interior of the shell thereof below the tubes, which latter are not shown. At 2 is represented the water-supply pipe to the boiler 1, and at 3 the steam-outlet pipe. At 4 appear some of the supports for the boiler 1 at the base. A water-column is indicated at 5, a water-glass at 6, and a steam gage at 7, all of usual and well-known construction.

A horizontal burner 8 is located in the boiler 1 far enough above the floor of said boiler to form a mixing chamber 9 wherein the gas and air commingle before being burned above said burner. The burner 8 is preferably made up of a plurality or multiplicity of hollow cones alternately arranged in inverted order and with the apexes which are uppermost perforated. That is to say, there are two sets of alternately arranged cones, the cones in one set having their apexes at the top and opening through such apexes, as shown at 10, and the cones in the other set having their apexes at the bottom, said last-mentioned apexes being imperforate. With a burner constructed in this manner I am able to burn gas to excellent advantage for heating purposes, especially when I provide, as in the present case, a plate 11, such plate having perforations 12 therein, and being located under and quite close to said burner. The perforations 12 are so placed in the plate 11 that they come directly under the aforesaid closed apexes of the inverted burner cones. The air and gas mixture in the chamber 9 first strikes the plate 11, is broken up thereby and escapes through the plate openings 12 to impinge on the inverted cones of the burner 8, and then said mixture is further broken up and distributed by said cones to the cones with the open bases and open apexes into which latter cones said mixture rises and passes through the openings 10 to be consumed or burned above said openings 10 and the burner. Sufficient space must be left between the burner 8 and the plate 11 for the free circulation of the combustible medium between them.

A perforated, tubular, pilot-light burner 13 is set in the casing of the boiler 1, with the perforated portion just above the adjacent part of the burner 8, and opening outside of said casing. Normally a small flame or pilot-light is maintained by the burner 13 all the time, and the instant the burner 8 is supplied with fuel the latter is ignited from said pilot-light, in the customary manner. A gas-supply pipe is represented at 14, and a small conduit 15 leads from that to the vicinity of the open outer end of the burner 13. The conduit 15 opens at the bottom adjacent to the outer end of the burner 13, as shown at 16, there being sufficient space between the two members for the necessary amount of air to enter said burner with the gas from said conduit. As long as the flame is maintained at the inner or perforated terminal of the burner 13, the fuel is supplied thereto, and no gas escapes on the way from the outlet 16 to said burner into the surounding atmosphere. The conduit 15 is provided with a valve 17 as usual.

A hollow elbow 18, constituting a primary mixing or fuel-supply chamber 19, opens at one end into one side of the mixing chamber 9 in the bottom of the boiler 1, as represented at 20. A vertical gas-inlet member 21 is secured to the elbow 18, partly within and partly without the same, and into the open end at the base of said elbow is screwed an air-inlet member which, in the present case, takes the form of a coupling 22. An air-supply pipe 23 has one end connected with the coupling 22 and the other end connected with a blower 24—see Fig. 1. As also represented in Fig. 1 and in part in Fig. 3, the blower 24 is driven by an electric motor 25, the circuit to and from such motor being through wires 26 and 27, contacts 28 and 29, a wire 30, a suitable switch 31, and a wire 32. The upper terminal of the coupling 22, inside, is made flaring, as shown at 33, in Fig. 2.

Having special reference to Fig. 2, it is seen that the gas-inlet member 21 has a valve-seat 34 at the upper end of an angular passage 35 in said member, such passage opening at the top through said valve-seat, and at the bottom laterally through one side of said member into the fuel-supply chamber 19. A coupling 36 connects the member 21 with the gas-supply pipe 14. A valve 37 is provided for the valve-seat 34, such valve opening upwardly into the coupling 36. The valve 37 is provided on the underside with a hollow open-bottom guide 38 and a long stem 39. The guide 38 has a sliding fit in the vertical part of the passage 35 and serves to center the valve 37, and said guide is provided in the sides directly under said valve with one or more openings 40, through which the gas passes from the coupling 36 when said valve is raised from its seat. The valve stem 39 passes downward from the valve 37, through the axial centers of the guide 38, the vertical part of the passage 35, and the base of the member 21, into the coupling 22, said stem being adapted to slide freely in the vertical passage provided for it in said base.

The parts and members are so arranged that the rod 39 is in line with the axial center of the coupling 22. The rod 39 is provided with a stop to limit the upward rise thereof and of the valve 37, such stop here consisting of a nut 41 screwed on to said rod below the base of the member 21. When the valve 37 is opened the nut or stop 41 comes into contact with the member 21, and so limits the upward movement of the parts, and serves to determine the amount of gas admitted through the openings 40, provided said stop be so positioned on the stem 39 as to contact with said member before said openings are carried entirely clear of the valve-seat 34. The stop 41 is, of course, adjustable on the screw-threaded portion of the valve stem. A check-nut 42 is provided on the stem or rod 39 for the stop 41. The stem 39 is provided with an air valve in the form of a disk 43 screwed on to that portion of said stem which extends into the coupling 22. The disk or air valve 43, like the stop 41, is adjustable on the valve stem, and a check-nut 44 is provided on said stem for said valve. The diameter of the valve 43 should be a little less than the interior diameter, below the flaring part 33, of the coupling 22.

The air, forced by the blower 24 through the pipe 23 and coupling 22, comes into contact with the valve 43, raises the same, and so causes the gas valve 37 to be lifted, through the medium of the stem 39, from the valve-seat 34, and gas to be admitted from the coupling 36 to the chamber 19, through the openings 40, guide 38, and passage 35. Thus both gas and air are admitted to the chamber 19 at the same time. The two elements commingle in the chamber 19 and immediately pass through the outlet into the large mixing chamber 9 below the plate 11 and the burner 8. As soon as the blower 24 stops, the forced draft through the pipe 23 ceases, and the valve members drop by gravity, the valve 37 returning to its seat and cutting off completely the flow of gas to the chamber 19.

The supply of air to the chamber 19 may be increased by screwing down the coupling 22 so as to increase the open space, between the valve 43 and the flaring walls 33, when said valve is raised by the air, and said supply may be decreased by screwing up said coupling so as to decrease such space when said valve is raised. Likewise, by locating the valve 43 higher on the stem 39 the volume of the air supply to the chamber 19 is increased, and by locating said valve lower on said stem such volume is decreased. Thus I provide a double adjustment or two adjustments for regulating the air supply.

Extending from and opening into the water column 5 is a tube 45, and securely mounted on the outer open end of said tube is a casing 46 having a diaphragm 47 therein. Having its base securely attached to the center of the diaphragm 47 on top, and rising from said diaphragm through the top of the casing 46, is a plunger 48. Rigidly attached to the top of the casing 46 is a forwardly-extending arm 49, and to the free or front end of said arm a lever 50 has its front end pivoted at 51. The lever 50 extends rearwardly over the protruding upper end of the plunger 48. A spring 52 is arranged between the lever 50 and a regulating screw 53. The screw 53 is inserted in the casing 46 at the rear and has a thumb-nut 54 thereon below said casing. The spring 52 holds the lever 50 down on the plunger 48, and the tension of said spring is regulated by the thumb-nut 54. Extending rearwardly and upwardly from the casing 46 is an arm 55, the upper terminal of such arm being of insulating material, as represented at 56, and carrying the contact 28 with which the wire 27 is connected. Pivotally attached at 57 to the vertical part of the arm 55 is an angular oscillatory arm 58 of insulating material. The contact 29, with which the wire 30 is connected, is carried at the upper end of the arm 58 in position to engage the contact 28 when such end of said arm is rocked toward the insulated part 56 of the arm 55. A spring 59 connects the rear end of the lever 50 with the bottom and rear end of the arm 58. The construction and arrangement of parts are such that, in the absence of pressure in the casing 46 under the diaphragm 47, the latter with the attached plunger 48 is in low position, being so held by the spring 52 acting through the lever 50, and said lever is also depressed and, through the medium of the connecting spring 59, causes the arm 58 to be so disposed as to retain the contact 29 in engagement with the contact 28; but, upon the raising of said diaphragm and plunger, by reason of the introduction into said casing under said diaphragm of a force superior to that of said spring 52, said lever is actuated upwardly, swinging on its pivot 51, by said plunger, the rear end of said lever passes above the horizontal plane of the pivot 57, having been below such plane before, and thus causes said spring 59 to exert an upward, instead of a downward, pull on the bottom of said arm, and to rock said arm on said pivot 57 in such a manner as to swing the top of said arm away from the insulated part 56, thus carrying said contact 29 away from said contact 28. In the first instance the circuit is closed through the engaged contacts 28 and 29, and in the second instance, when said contact 29 is separated from said contact 28, said circuit is opened or broken. The circuit is reestablished when the pressure is removed from beneath the diaphragm 47, and the spring 52 draws down the lever 50 into its former position, and, by means of the spring 59, snaps the arm 58 with the contact 29 into closed position again.

A rearwardly and forwardly extending finger 60 limits the movement of the arm 58, when the latter snaps into open position, such finger being attached to the back side of the vertical part of the arm 55 and projecting over the short or horizontal branch of said arm 58.

The tube 45 has a drop 61 therein to form a water-trap between the water column 5 and the diaphragm 47, for the purpose of protecting said diaphragm from steam, in a manner well understood in the art.

The operation as a whole of the appliance is described as follows: In the first place the valve 17 is opened and the gas or gas and air mixture is lighted at the burner 13. This is the pilot-light and it burns continuously until such time as the valve 17 may be again closed. Next the switch 31 is thrown to complete the circuit and start the motor 25, it being remembered that the contact 29 is at this time in engagement with the contact 28. The motor 25 sets the blower 24 in motion and air is forced through the pipe 23 and the coupling 22 into the chamber 19. In entering the chamber 19 the air encounters the disk or valve 43 and elevates said disk and with it the rod 39 and the valve 37. When the valve 37 is raised from its seat, the way to the chamber 19 is opened, through the openings 40, the guide 38, and the passage 35, so that gas immediately passes from the coupling 36 to said chamber. In the chamber 19 the air and gas commingle and pass into the chamber 9 wherein they are still more thoroughly mixed. The fuel mixture in the chamber 9 rises through the plate openings 12 to the burner 8, and then rises through the burner orifices 10. As soon as the fuel mixture reaches the top of the burner 8, it is ignited by the pilot-light and burns in the usual manner. In due time the lighted burner 8 heats the boiler and steam is generated therein, the pressure from which steam, when such pressure reaches a predetermined amount, acting through the water-column 5 and the tube 45, forces up the diaphragm 47 and so overcomes the resistance of the spring 52 and elevates the lever 50 by means of the plunger 48. This action causes the contact 29 to be separated from the contact 28, in the manner hereinbefore fully explained, and breaks the circuit between the wires 27 and 30. The break in the circuit cuts off the power from the motor 25, and said motor comes to a stop and so stops the blower 24. There now being no pressure beneath the valve 43, said valve and connected parts drop and shut off the gas from the chamber 19. Without further gas and air supply for the burner 8, combustion above or at such burner ceases. There is now no consumption of gas, except the small amount used to supply the pilot-light.

Without heat at the burner 8 the temperature of the boiler falls, and such temperature continues to fall until the pressure under the diaphragm 47 decreases to a point which permits the spring 52 to reassert itself and bring about the closing of the circuit once more. The parts are now initially disposed, as best shown in Figs. 2 and 3, but the air forced through the pipe 23 by the blower 24, which has just been restarted, almost instantly causes the valve 37 to be reopened, and after this the cycle of events previously described is repeated.

Thus the operations of the several parts and members and the alternate lighting and extinguishing of the burner 8 go on indefinitely or until the switch 31 is thrown back to produce a break in the circuit which it is beyond the automatic action of the appliance to close. The pilot-light is extinguished when the appliance is not in use.

It is evident that this valve mechanism is equally well adapted for an oil burning appliance, wherein the air is sucked into a chamber such as the chamber 19, instead of being blown into the same.

What I claim as my invention, and desire to secure by Letters Patent is—

1. The combination, in a heating appliance, with a heater, an apertured burner in such heater, an apertured plate in said heater under said burner, the apertures in said plate being out of line with the apertures in said burner, of a hollow member opening into the space below said plate, and having an air inlet and a gas inlet, the latter having a valve-seat, a valve for said seat, said valve being provided with a stem which extends into said inlet, and a valve member on said stem in said inlet and adapted to operate freely therein, the arrangement of parts being such that the air, in passing through the inlet therefor, impinges on said valve member, moves the same, with said stem and gas valve, axially, and opens said gas valve.

2. The combination, in a heating appliance, with a heater provided with a burner, and having a mixing chamber under said burner, and a pilot-light burner in said heater adjacent to said first-mentioned burner, of a hollow member opening into said mixing chamber, and having an air inlet, a gas-supply pipe, a gas-inlet member connected with said pipe and opening into said hollow member, and provided with a valve-seat, a gas valve for said seat, a rod attached to said valve and extending through said gas-inlet member into said air inlet, an air valve on said rod in said air inlet, and a supply pipe for said pilot-light burner, said last-mentioned pipe being connected with said first-mentioned pipe, the arrangement of parts being such that the air, in passing through the inlet therefor, acts on said air valve to move the same axially and open said gas valve.

3. The combination, in a heating appliance, with the mixing chamber of a heater, of a hollow member opening into said chamber, and having an air inlet and a gas inlet, a blower, a pipe connecting said blower with said air inlet, a gas valve for said gas inlet, a rod attached to said valve and extending into said air inlet, and an air valve on said rod in said air inlet, the arrangement of parts being such that the air, forced by said blower through said air inlet, acts on said air valve to move the same axially and open said gas valve.

4. The combination, in a heating appliance, with the mixing chamber of a heater, of a hollow member opening into said chamber, and having an air inlet and a gas inlet, a blower, automatic means to start and stop said blower, such means being dependent for action on the temperature of said heater, a pipe connecting said blower with said air inlet, a gas valve for said gas inlet, a rod attached to said valve and extending into said air inlet, and an air valve on said rod in said air inlet, the arrangement of parts being such that the air, forced by said blower through said air inlet, acts on said air valve to move the same axially and open said gas valve.

5. The combination, in a heating appliance, with the mixing chamber of a heater, of a hollow member opening into said chamber, and having an air inlet and a gas outlet, a blower, electrically-operated driving means for said blower, an electric circuit for said means, said circuit including circuit-breaking means, and means, dependent for action on the temperature of said heater, to operate said circuit-breaking means, a pipe connecting said blower with said air inlet, a gas valve for said gas inlet, a rod attached to said valve and extending into said air inlet, and an air valve on said rod in said air inlet, the arrangement of parts being such that the air, forced by said blower through said air inlet, acts on said air valve to move the same axially and open said gas valve.

6. The combination, in a heating appliance, with a chamber having an air inlet and a gas inlet, said gas inlet having a valve-seat, a valve for said seat, said valve being provided with a stem which extends into said air inlet, and a valve member on said stem in said air inlet and adapted to slide freely therein, said valve member being adapted to be actuated, with said stem and gas valve, in one direction, by the air impinging, when it enters said chamber, on said valve member, of automatic means to control such entrance of air.

7. The combination, in a heating appliance, with a chamber having an air inlet and a gas inlet, said gas inlet having a valve-seat, a valve for said seat, said valve being provided with a stem which extends into said air inlet, and a valve member on said stem in said air inlet and adapted to slide freely therein, said valve member being adapted to be actuated, with said stem and gas valve, in one direction, by the air impinging, when it enters said chamber, on said valve member, of temperature-controlled means to control such entrance of air.

8. The combination, in a heating appliance, with a chamber having an air inlet and a gas inlet, said gas inlet having a valve-seat, a valve for said seat, said valve being provided with a stem which extends into said air inlet, and a valve member on said stem in said air inlet and adapted to slide freely therein, said valve member being unattached except to said stem, and adapted to be actuated, with said stem and gas valve, in one direction, by the air impinging, when it enters said chamber, on said valve member, to make a passage for the air past said valve member and open said gas valve, of means forcibly to produce such entrance of air.

9. The combination, in a heating appliance, with a chamber having an air inlet and a gas inlet, said gas inlet having a valve-seat, a valve for said seat, said valve being provided with a stem which extends into said air inlet, and a valve member on said stem in said air inlet and adapted to slide freely therein, said valve member being adapted to be actuated with said stem and gas valve, in one direction, by the air impinging, when it enters said chamber, on said valve member, of a blower arranged forcibly to produce such entrance of air.

10. The combination, in a heating appliance, with a chamber having an air inlet and a gas inlet, said gas inlet having a valve-seat, a valve for said seat, said valve being provided with a stem which extends into said air inlet, and a valve member on said stem in said air inlet and adapted to slide freely therein, said valve member being adapted to be actuated, with said stem and gas valve, in one direction, by the air impinging, when it enters said chamber, on said valve member, of a blower arranged forcibly to produce such entrance of air, and automatic means to start and stop such blower.

11. The combination, in a heating appliance, with a chamber having an air inlet and a gas inlet, said gas inlet having a valve-seat, a valve for said seat, said valve being provided with a stem which extends into said air inlet, and a valve member on said stem in said air inlet and adapted to slide freely therein, said valve member being adapted to be actuated, with said stem and gas valve, in one direction, by the air impinging, when it enters said chamber, on said valve member, of a blower arranged forcibly to produce such entrance of air, electrically-operated driving means for said blower, and an electric circuit for said means, said circuit including temperature-controlled circuit-breaking means.

12. The combination, in a heating appliance, with a heater having a mixing chamber, and provided with a water-column, of a hollow member opening into said chamber and having an air inlet and a gas inlet, connected and reciprocable air and gas valves for said inlets, said air valve being air operated and controlling the movement of said gas valve, a blower, a connection between said blower and said air inlet, an electric motor for said blower, an electric circuit for said motor, such circuit including circuit-making and -breaking contacts, a tubular member attached to said water-column, a casing in open communication through said tubular member with said water-column, a diaphragm in said casing, a plunger attached to said diaphragm, and mechanism adapted to be operated by said plunger to separate said contacts.

ELMER F. FISHER.

Witnesses:
A. B. LEWIS,
F. A. CUTTER.